United States Patent
He et al.

(10) Patent No.: US 12,351,147 B2
(45) Date of Patent: Jul. 8, 2025

(54) BRAKING MODE SWITCHING APPARATUS AND BRAKE CONTROL SYSTEM FOR VEHICLE

(71) Applicant: Huawei Digital Power Technologies Co., Ltd., Shenzhen (CN)

(72) Inventors: Yuhui He, Shanghai (CN); Jianjun He, Dongguan (CN); Yongjian Wan, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 420 days.

(21) Appl. No.: 17/993,174

(22) Filed: Nov. 23, 2022

(65) Prior Publication Data
US 2023/0159009 A1    May 25, 2023

(30) Foreign Application Priority Data
Nov. 25, 2021  (CN) .......................... 202111415849.1

(51) Int. Cl.
*B60T 7/04* (2006.01)

(52) U.S. Cl.
CPC ......... *B60T 7/042* (2013.01); *B60T 2270/402* (2013.01)

(58) Field of Classification Search
CPC .... B60T 7/042; B60T 2270/402; B60T 17/18; B60T 11/046; B60T 11/04
See application file for complete search history.

(56) References Cited

U.S. PATENT DOCUMENTS

| | | | | |
|---|---|---|---|---|
| 4,658,939 | A  * | 4/1987 | Kircher ................. | B60T 8/4809 188/106 P |
| 2007/0193798 | A1* | 8/2007 | Allard ....................... | B60T 7/22 180/169 |
| 2020/0271222 | A1* | 8/2020 | Kamio .................... | B60T 17/18 |
| 2021/0347349 | A1* | 11/2021 | Wang ...................... | B60T 8/171 |

FOREIGN PATENT DOCUMENTS

| | | |
|---|---|---|
| CN | 206841419 U | 1/2018 |
| CN | 108944885 A | 12/2018 |
| CN | 110901403 A | 3/2020 |
| CN | 111216698 A | 6/2020 |
| CN | 111497811 A | 8/2020 |

(Continued)

*Primary Examiner* — Sizo B Vilakazi
(74) *Attorney, Agent, or Firm* — Maier & Maier, PLLC (57) ABSTRACT

A braking mode switching apparatus includes a braking mode selection component, a transmission member, a stopper, a driver, and a motion control component. The braking mode selection component can move between a first position corresponding to a first braking mode and a second position corresponding to a second braking mode. The transmission member has a first transmission portion and a second transmission portion. The stopper includes a first stopper portion and a second stopper portion. The motion control component is configured to abut against the first stopper portion in response to a case in which the driver is powered on, where the braking mode selection component is located in the first position; and abut against the second stopper portion in response to a case in which the driver is not powered on, where the braking mode selection component is located in the second position.

20 Claims, 4 Drawing Sheets

(56) References Cited

FOREIGN PATENT DOCUMENTS

| | | | |
|---|---|---|---|
| CN | 111845680 | A | 10/2020 |
| CN | 211685039 | U | 10/2020 |
| CN | 112208545 | A | 1/2021 |
| EP | 1752351 | A1 | 2/2007 |
| EP | 4122783 | A1 | 1/2023 |
| JP | 2009132359 | A | 6/2009 |

* cited by examiner

BRAKING MODE SWITCHING APPARATUS AND BRAKE CONTROL SYSTEM FOR VEHICLE

CROSS-REFERENCE TO RELATED APPLICATIONS

This application claims priority to Chinese Patent Application No. 202111415849.1, filed on Nov. 25, 2021, which is hereby incorporated by reference in its entirety.

TECHNICAL FIELD

The embodiments relate to the vehicle field, a braking mode switching apparatus, and a brake control system for a vehicle.

BACKGROUND

As a service life of a vehicle increases, an electrical system of the vehicle may become faulty. This brings a serious potential risk to driving of the vehicle. In particular, when the electrical system that becomes faulty is associated with safety performance (for example, braking performance) of the vehicle, such a failure is usually fatal. Therefore, how to ensure driving safety even if the electrical system of the vehicle is faulty is an important challenge.

SUMMARY

The embodiments may provide a braking mode switching apparatus and a brake control system for a vehicle, to overcome at least some of the foregoing problem and/or another potential problem existing in the conventional technology.

According to a first aspect, a braking mode switching apparatus is provided. The braking mode switching apparatus includes: a braking mode selection component, where the braking mode selection component can move between a first position corresponding to a first braking mode and a second position corresponding to a second braking mode; a transmission member, where the transmission member is coupled to the braking mode selection component and has a first transmission portion and a second transmission portion; a stopper, including a first stopper portion and a second stopper portion; and a driver, including an output shaft; and a motion control component, disposed on the output shaft and coupled to the braking mode selection component. The motion control component is configured to: abut against the first stopper portion in response to a case in which the driver is powered on, where the braking mode selection component is located in the first position, so that the first transmission portion engages with a first execution portion; and abut against the second stopper portion in response to a case in which the driver is not powered on, where the braking mode selection component is located in the second position, so that the second transmission portion engages with a second execution portion.

According to the embodiments, the transmission member may move to different positions based on an on/off state of the driver, to switch between different braking modes.

In an implementation, the motion control component includes: a cylindrical body, extending along a first central axis and coupled to the output shaft of the driver; a protrusion portion, extending away from the cylindrical body from a surface of the cylindrical body, where the protrusion portion is configured to: abut against the first stopper portion in response to a case in which the driver is powered on, and abut against the second stopper portion in response to a case in which the driver is not powered on; a coupling shaft, extending along a second central axis from one end that is of the cylindrical body and that is close to the protrusion portion, where the second central axis deviates from and is parallel to the first central axis; and a drive ring, sleeved on the coupling shaft and coupled to the braking mode selection component. In such an arrangement, the motion control component may reliably switch between braking modes.

In an implementation, when the braking mode selection component is in the first position or the second position, a vertical connecting line between the first central axis and the second central axis is parallel to a first direction pointing from the first position to the second position. In such an arrangement, the driver may be prevented from being subject to a reverse acting force of the braking mode selection component, to prevent the driver from overheating.

In an implementation, the braking mode switching apparatus further includes an elastic member, coupled to the cylindrical body of the motion control component, and configured to reset the cylindrical body when the driver is not powered on, so that the braking mode selection component moves to the second position. In such an arrangement, when the driver cannot operate normally due to a failure, the elastic member performs a reset action, so that the braking mode selection component can automatically switch between braking modes without a need to perform a manual operation.

In an implementation, the braking mode switching apparatus further includes a housing. The housing includes a limiting plate, and the limiting plate is provided with a groove for accommodating the braking mode selection component, to limit the braking mode selection component, so that the braking mode selection component moves along a first direction pointing from the first position to the second position. In such an arrangement, movement of the braking mode selection component may be effectively limited.

In an implementation, the first transmission portion includes a first toothed portion, the first execution portion includes a second toothed portion that is configured to engage with the first toothed portion, and the first toothed portion engages with the second toothed portion when the driver is powered on. In such an arrangement, transmission between the first transmission portion and the first execution portion may be implemented in a reliable and cost-controllable manner.

In an implementation, the second transmission portion includes a third toothed portion, the second execution portion includes a fourth toothed portion that is configured to engage with the third toothed portion, and the third toothed portion engages with the fourth toothed portion when the driver is not powered on. In such an arrangement, transmission between the second transmission portion and the second execution portion may be implemented in a reliable and cost-controllable manner.

According to a second aspect, a brake control system for a vehicle is provided. The brake control system includes the braking mode switching apparatus according to the first aspect and a brake pedal. The brake pedal is coupled to a transmission member by using a connecting rod. In such an arrangement, switching of a braking mode of the brake control system for a vehicle can be implemented without a need to perform an additional operation.

In an implementation, the brake control system further includes a feedback assembly coupled to a first execution portion of the braking mode switching apparatus, and the feedback assembly is configured to provide a reverse acting force to the brake pedal when a driver is powered on. In such an arrangement, a driver may obtain more natural driving experience.

In an implementation, the brake control system further includes a brake cable coupled to a second execution portion of the braking mode switching apparatus, and the brake cable is configured to brake the vehicle when a driver is not powered on. In such an arrangement, safe driving of the vehicle may be ensured when an electrical system of the vehicle is faulty.

Descriptions of the plurality of embodiments appear below.

BRIEF DESCRIPTION OF THE DRAWINGS

The foregoing features, advantages and aspects and other features, advantages, and aspects of the embodiments become clearer with reference to the accompanying drawings and the following detailed descriptions. In the accompanying drawings, same or similar reference numerals represent same or similar elements. The accompanying drawings are not necessarily drawn in proportion.

DETAILED DESCRIPTION OF THE EMBODIMENTS

The following describes embodiments in more detail with reference to accompanying drawings. Although some embodiments are shown in the accompanying drawings, it should be understood that the embodiments may be implemented in various forms and should not be construed to be limited to the embodiments described herein. It should be understood that the accompanying drawings and the embodiments are merely used as examples but are not used to limit the scope of the embodiments.

In descriptions of the embodiments, the term "including" and similar terms should be understood as non-exclusive inclusion, namely, "including but not limited to." The term "based on" should be understood as "based on at least a part of". The term "one embodiment" or "this embodiment" should be understood as "at least one embodiment". The terms "first", "second", and the like may refer to different or same objects. Other explicit and implied definitions may be further included below.

The following describes some implementations of a brake control system according to the embodiments with reference to a use scenario of a vehicle. The term "vehicle" may include various forms. For example, the vehicle may be an electric vehicle, a fuel vehicle, or a hybrid vehicle. In some embodiments, the vehicle may be a household vehicle, a passenger vehicle of an operational nature, a freight vehicle of an operational nature, or the like. In some embodiments, the vehicle may be a vehicle equipped with an autonomous driving capability, the autonomous driving capability may include but is not limited to an assisted driving capability, a semi-autonomous driving capability, a highly automated driving capability, or a fully automated driving capability. A form of the vehicle is not limited by the forms listed above, provided that a braking operation needs to be performed for the vehicle.

Figure 1:
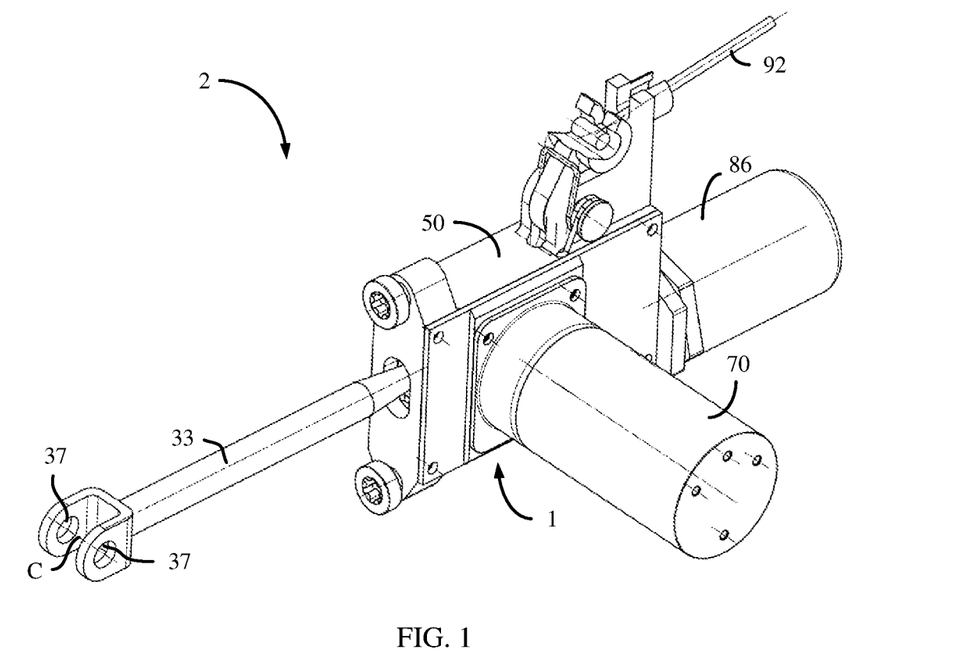
FIG. 1 is a three-dimensional schematic diagram showing a braking mode switching apparatus according to an embodiment.

The following describes more details of the embodiments with reference to FIG. 1 to FIG. 4. FIG. 1 is an overall three-dimensional schematic diagram of a braking mode switching apparatus 1 in a brake control system 2 for a vehicle according to an embodiment. The braking mode switching apparatus 1 is configured to switch a braking mode of the vehicle.

The following describes the braking mode of the vehicle. Currently, many vehicles are braked by using an electromechanical brake (EMB) system. When an electrical system of the vehicle runs normally, the EMB system may sense that a brake pedal is depressed, and control, in an electrical manner, a brake pad to tightly hold a tire of the vehicle, so as to generate a braking force to implement braking. In the embodiments, this mode is referred to as a "first braking mode". The EMB system needs to depend on the electrical system of the vehicle to provide a power support. Therefore, once the electrical system fails, the EMB system cannot operate normally. In this case, a mechanical drive system needs to be used to perform braking. In the embodiments, this mode is referred to as a "second braking mode".

As shown in FIG. 1, the braking mode switching apparatus 1 is coupled to a connecting rod 33. The brake pedal (not shown) may be connected to a side of the connecting rod 33. The brake pedal may be coupled to a connecting hole 37 located on a side of the connecting rod 33 and rotate around an axis C of the connecting rod 33. When the brake pedal is depressed, a braking action may be transmitted to an inside of the braking mode switching apparatus 1 through the connecting rod 33, and the braking mode switching apparatus 1 may switch the braking mode of the vehicle between the first braking mode and the second braking mode based on a state of the electrical system of the vehicle. This is described in more detail below with reference to an internal structure of the braking mode switching apparatus 1.

Figure 2:
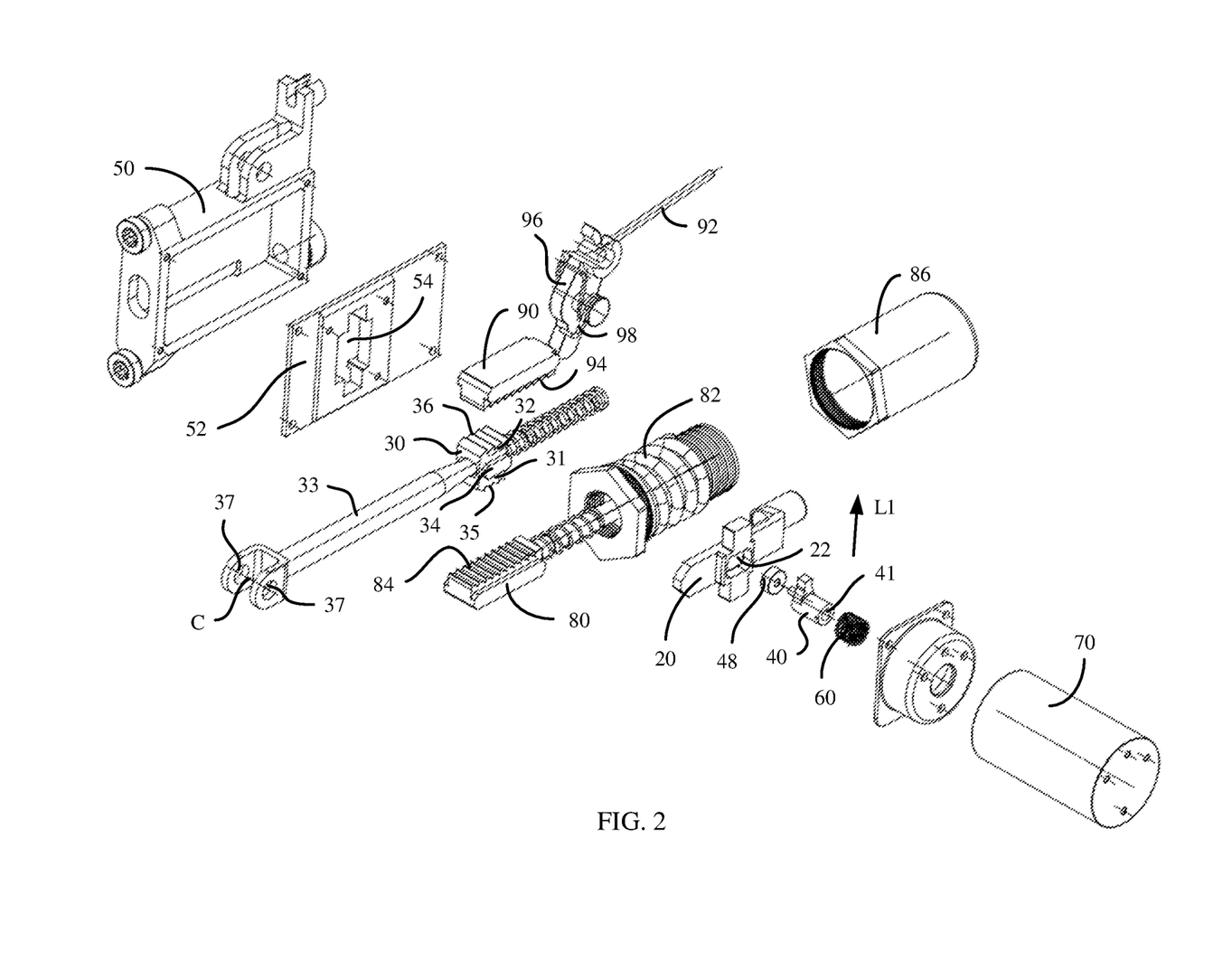
FIG. 2 is a schematic exploded view that shows a braking mode switching apparatus shown in FIG. 1 and that exists when the braking mode switching apparatus is viewed from a first perspective.
Figure 3:
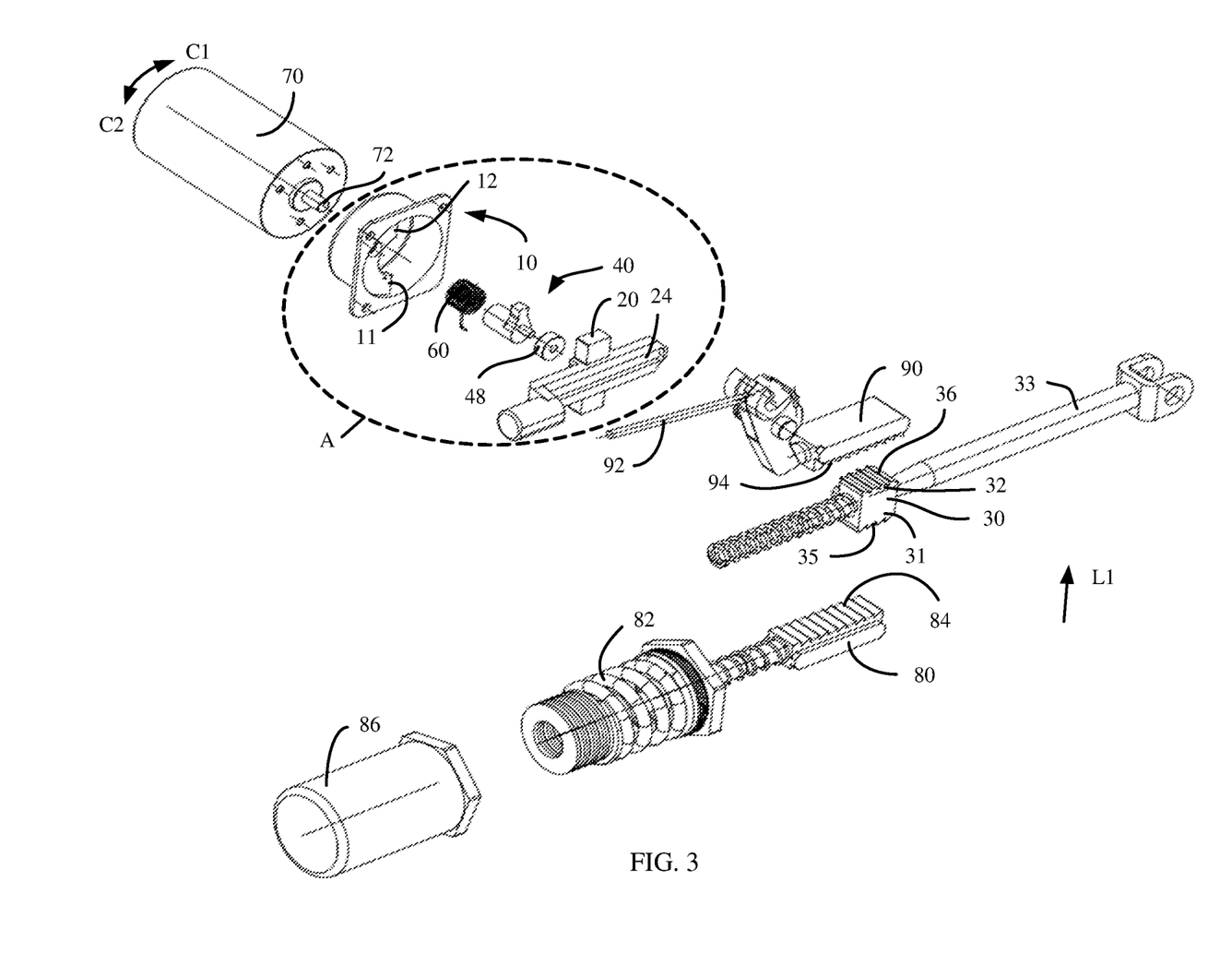
FIG. 3 is a schematic exploded view that shows a braking mode switching apparatus shown in FIG. 1 and that exists when the braking mode switching apparatus is viewed from a second first perspective, where some components are omitted.

More details of the braking mode switching apparatus 1 are described below with reference to FIG. 2 to FIG. 4. As shown in FIG. 2, the braking mode switching apparatus 1 generally includes a braking mode selection component 20, a transmission member 30, a stopper 10, a driver 70, and a motion control component 40. The braking mode selection component 20 can move between a first position and a second position along a first direction L1, the first position corresponds to the first braking mode, the second position corresponds to the second braking mode, and the first direction L1 is a direction pointing from the first position to the second position. The transmission member 30 is coupled to the braking mode selection component 20 and includes a first transmission portion 31 and a second transmission portion 32. With reference to FIG. 2 and FIG. 3, in an illustrated embodiment, a groove 24 may be disposed on a side that is of the braking mode selection component 20 and that faces the transmission member 30, a protrusion 34 may be disposed on a side that is of the transmission member 30 and that faces the braking mode selection component 20, and at least a part of the protrusion 34 may be accommodated in the groove 24, so that the braking mode selection component 20 is coupled to the transmission member 30. In such an arrangement, when the braking mode selection component 20 moves between the first position and the second position along the first direction L1, the transmission member 30 may be driven to move along the first direction L1.

As shown in FIG. 3, the stopper 10 includes a first stopper portion 11 and a second stopper portion 12, to limit movement of the motion control component 40. In the illustrated embodiment, the stopper 10 includes a C-shaped physical structure, and the first stopper portion 11 and the second stopper portion 12 may be two ends of the physical structure and may be used to limit the motion control component 40 to a moving range. For example, as shown in FIG. 3, the moving range may be 180°, the first stopper portion 11 is a lower limiting position, and the second stopper portion 12 is an upper limiting position. In another embodiment, the moving range may be any angle that is approximately between 150° and 210°. In a further embodiment, the moving range may be larger or smaller, and this aspect is not strictly limited.

In some embodiments, the stopper 10 may be directly or indirectly mounted on a frame of the vehicle. It should be understood that a form of the stopper 10 described herein is merely an example but imposes no limitation. In a scenario, a structure of the stopper 10 and a corresponding travel range may be correspondingly adjusted based on an actual requirement of driving.

As shown in FIG. 3, the driver 70 may include an output shaft 72. The output shaft 72 is coupled to the motion control component 40, so that the motion control component 40 can rotate with the output shaft 72. The motion control component 40 is coupled to the braking mode selection component 20. If the driver 70 is powered on, the motion control component 40 abuts against the first stopper portion 11, and the braking mode selection component 20 is located in the first position, so that the transmission member 30 moves downward, and the first transmission portion 31 of the transmission member 30 engages with a first execution portion 80. The first execution portion 80 is located outside the braking mode switching apparatus 1 and is stationary in the first direction L1. If the driver 70 is not powered on, the motion control component 40 abuts against the second stopper portion 12, and the braking mode selection component 20 is located in the second position, so that the transmission member 30 moves upward, and the second transmission portion 32 of the transmission member 30 engages with a second execution portion 90. The second execution portion 90 is located outside the braking mode switching apparatus 1 and is also stationary in the first direction L1. Based on whether the driver 70 is powered on, a moving direction of the transmission member 30 may be changed, and the braking mode switching apparatus 1 engages with either of the first execution portion 80 and the second execution portion 90, to switch between different braking modes.

Figure 4:
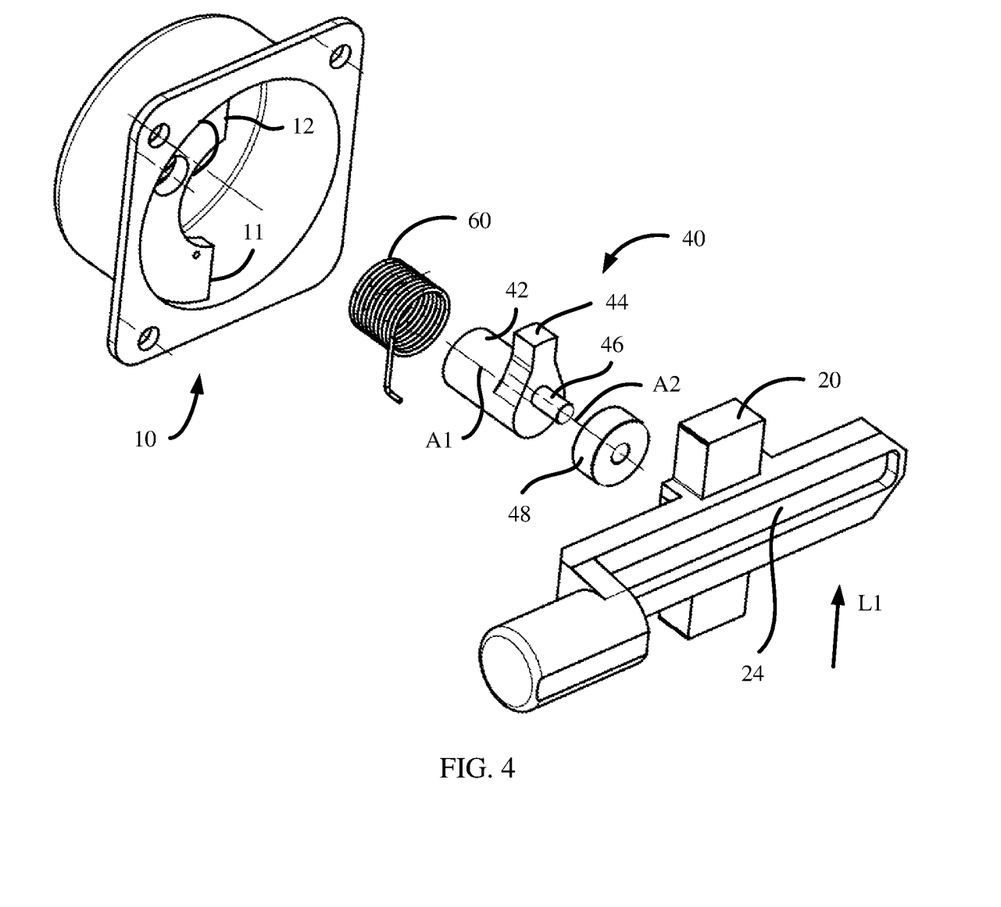
FIG. 4 is an enlarged schematic diagram showing a detail of a portion A in FIG. 3.

As shown in FIG. 4, the motion control component 40 may include a cylindrical body 42. The cylindrical body 42 extends around a first central axis A1. With reference to FIG. 2, the cylindrical body 42 includes an annular groove 41 that faces and accommodates the output shaft 72 of the driver 70, so that the cylindrical body 42 is coupled to the output shaft 72 of the driver 70.

The motion control component 40 is provided with a protrusion portion 44 that extends away from the cylindrical body 42 from a surface of the cylindrical body 42. When the driver 70 is powered on, the output shaft 72 is used to drive the motion control component 40 to rotate, so that the protrusion portion 44 of the motion control component 40 abuts against the first stopper portion 11. When the driver 70 is not powered on, the output shaft 72 is used to drive the motion control component 40 to rotate, so that the protrusion portion 44 of the motion control component 40 abuts against the second stopper portion 12. The motion control component 40 further includes a coupling shaft 46 that extends from one end of the cylindrical body 42 and includes a drive ring 48 disposed on the coupling shaft 46. As shown in FIG. 4, the coupling shaft 46 and the protrusion portion 44 are located on a same side of the first central axis A1. The coupling shaft 46 extends approximately along a second central axis A2. As shown in FIG. 4, the second central axis A2 is parallel to the first central axis A1, and deviates from the first central axis A1.

The drive ring 48 is coupled to the braking mode selection component 20. This is best shown in FIG. 2. In the illustrated embodiment, a receiving portion 22 is disposed on a side that is of the braking mode selection component 20 and that faces the drive ring 48, and the receiving portion 22 is configured to receive the drive ring 48, so that when the drive ring 48 moves with the coupling shaft 46, the braking mode selection component 20 can be driven to move.

The following describes the first braking mode in this embodiment with reference to a schematic scenario. In some embodiments, the driver 70 may be a motor on the vehicle. Provided that the electrical system of the vehicle runs normally, the driver 70 may be powered on. In this case, the driver 70 may rotate along a first rotation direction C1 shown in FIG. 3, so that the output shaft 72 is used to drive the motion control component 40 to rotate in the first rotation direction C1. In this case, the protrusion portion 44 of the motion control component 40 rotates to a position abutting against the first stopper portion 11. Because the coupling shaft 46 and the protrusion portion 44 are located on a same side of the first central axis A1, currently, the coupling shaft 46 moves to a lower limiting position of the coupling shaft 46, and the drive ring 48 is also located in a lower limiting position of the drive ring 48, to drive the braking mode selection component 20 and the transmission member 30 to move downward. In this case, referring to FIG. 2 and FIG. 3, the first transmission portion 31 of the transmission member 30 engages with the first execution portion 80.

In some embodiments, the brake control system 2 of the vehicle may include a feedback assembly 82 that is coupled to the first execution portion 80. In a further embodiment, the feedback assembly 82 may be a spring or a spring group, the spring or the spring group extend along a direction of an axis of the feedback assembly 82, to provide a reverse acting force to the brake pedal when the driver 70 is powered on. In such an arrangement, when the electrical system of the vehicle operates normally, and a driver depresses the brake pedal, a proper braking feedback may be obtained. Based on the feedback, the driver may learn that the state of the electrical system of the vehicle is normal.

In some embodiments, as shown in FIG. 2, the braking mode switching apparatus 1 may further include a barrel 86, configured to mount and accommodate the feedback assembly 82. The barrel 86 may be directly or indirectly fastened to the frame of the vehicle, to ensure that the feedback assembly 82 moves only along the axis the feedback assembly 82 in response to a case in which the brake pedal is depressed.

The following describes the second braking mode in this embodiment with reference to a schematic scenario. In some embodiments, the braking mode switching apparatus 1 further includes an elastic member 60 coupled to the cylindrical body 42 of the motion control component 40. As shown in FIG. 4, the elastic member 60 may be in a form of a torsion spring. As shown in FIG. 3, once the electrical system on the vehicle fails, power provided to the driver 70 also fails. In this case, the driver 70 is powered on. Under a reset action of the elastic member 60, the cylindrical body 42 of the motion control component 40 rotates along a second rotation direction C2 shown in FIG. 3. In this case, the protrusion portion 44 of the motion control component 40 rotates to a position abutting against the second stopper portion 12, namely, the upper limiting position shown in the figure. Because the coupling shaft 46 and the protrusion portion 44 are located on a same side of the first central axis A1, currently, the coupling shaft 46 moves to the upper limiting position of the coupling shaft 46, and the drive ring 48 is also located in the upper limiting position of the drive ring 48, to drive the braking mode selection component 20 and the transmission member 30 to move upward. In this case, referring to FIG. 2 and FIG. 3, the second transmission portion 32 of the transmission member 30 engages with the second execution portion 90.

In some embodiments, the brake control system 2 of the vehicle may include a brake cable 92 that is coupled to the second execution portion 90, and the brake cable 92 is configured to mechanically brake the vehicle when the driver 70 is not powered on. As shown in FIG. 2, the brake cable 92 may be connected to the second execution portion 90 by using a guide arm 96. The brake cable 92 may be connected to a series of mechanical transmission assemblies (not shown), and the vehicle may be braked by using the brake cable 92 in various transmission manners that are known or to be developed in the future and are not limited in this embodiment. In such an arrangement, if the electrical system of the vehicle cannot operate normally, when the driver depresses the brake pedal, the connecting rod 33 pushes the transmission member 30 to drive the second execution portion 90 to move, to perform a braking action on the brake cable 92 by using the guide arm 96, and ensure that the vehicle can be braked in a case of an electrical failure and parked for maintenance if necessary, so as to improve driving safety.

In some embodiments, as shown in FIG. 2, the braking mode switching apparatus 1 may further include a rebound spring 98 that is coupled to the guide arm 96. The rebound spring 98 may be in the form of the torsion spring as shown in the figure. After depressing of the brake pedal is released, the rebound spring 98 may perform a reset action of the rebound spring 98, so that the brake cable 92 returns to an original position, to repeat the foregoing motion next time the brake pedal is depressed.

According to the brake control system in this embodiment, when an electrical device of the vehicle fails, the braking mode may be automatically switched, so that without a need to perform an addition operation by a driver, it is ensured that braking performance of the vehicle is not affected.

In some embodiments, as shown in FIG. 2, the braking mode switching apparatus 1 further includes a housing 50. The housing 50 may be directly or indirectly mounted on the frame of the vehicle, so that the housing 50 is stationary relative to the vehicle. The housing 50 may include a limiting plate 52, and the limiting plate 52 is provided with a groove 54, configured to accommodate the braking mode selection component 20, to limit the braking mode selection component 20, so that the braking mode selection component 20 moves along the first direction L1.

In some embodiments, when the braking mode selection component 20 is located in the first position or the second position, in other words, when the protrusion portion 44 of the motion control component 40 is in an upper limiting position and a lower limiting position of the protrusion portion 44, a vertical connecting line between the first central axis A1 and the second central axis A2 is parallel to the first direction L1.

As discussed above, the braking mode selection component 20 is built in the groove 54 of the limiting plate 52 of the housing 50. Therefore, the braking mode selection component 20 can move only along the first direction L1 shown in FIG. 2 to FIG. 4. Because the drive ring 48 is built in the receiving portion 22 of the braking mode selection component 20, an acting force that is exerted by the output shaft 72 of the driver 70 on the drive ring 48 is parallel to the first direction L1. In this case, regardless of whether the motion control component 40 is located in the upper limiting position shown in FIG. 4 or located in the lower limiting position opposite to the upper limiting position, because the vertical connecting line between the first central axis A1 of the motion control component 40 and the second central axis A2 of the drive ring 48 is parallel to the first direction L1, a torque is not generated for the acting force to disengage the protrusion portion 44 of the motion control component 40 from the upper limiting position or the lower limiting position. In other words, the motion control component 40 is "self-locked" in the upper limiting position or the lower limiting position of the motion control component 40, and only under an action of the driver 70 serving as a driving apparatus, the output shaft 72 is used to drive the motion control component 40 to be disengaged from the upper limiting position or the lower limiting position, while when the braking mode selection component 20 serving as a driven apparatus moves, the motion control component 40 is not disengaged from the upper limiting position or the lower limiting position. Based on the mechanical self-locking principle, a too large reverse acting force exerted by the braking mode selection component 20 on the driver 70 may be avoided, to avoid a heat generation problem of the driver 70 due to the too large reverse acting force.

In some embodiments, as shown in FIG. 2 and FIG. 3, the first transmission portion 31 may include a first toothed portion 35, and the first execution portion 80 includes a second toothed portion 84 that matches the first toothed portion 35. As shown in the figure, the first toothed portion 35 and the second toothed portion 84 may be in a form of a gear rack. In such an arrangement, a motion of the transmission member 30 may be stably and reliably transmitted to the first execution portion 80.

In some embodiments, as shown in FIG. 2 and FIG. 3, the second transmission portion 32 may include a third toothed portion 36, and the second execution portion 90 includes a fourth toothed portion 94 that matches the third toothed portion 36. As shown in the figure, the third toothed portion 36 and the fourth toothed portion 94 may be in a form of a gear rack. In such an arrangement, the motion of the transmission member 30 may be stably and reliably transmitted to the second execution portion 90.

In comparison with a conventional solution, the brake control system in the embodiments may automatically switch the braking mode when the electrical device of the vehicle fails, to avoid a traffic accident that occurs due to low braking performance. In addition, an overheating problem of the motor of the vehicle may also be overcome, to produce a good use effect.

Although is the embodiments are described with structural features and/or methodological actions, it should be understood that the embodiments are not limited to the features or actions described. On the contrary, the features and actions described above are merely example forms of embodiments and are non-limiting.

What is claimed is:

1. A braking mode switching apparatus, comprising:
a braking mode selection component configured to move between a first position corresponding to a first braking mode and a second position corresponding to a second braking mode;
a transmission member coupled to the braking mode selection component and having a first transmission portion and a second transmission portion;
a stopper comprising a first stopper portion and a second stopper portion;
a driver comprising an output shaft; and
a motion control component disposed on the output shaft and coupled to the braking mode selection component, wherein the motion control component (40) is configured to:
abut against the first stopper portion in response to a case in which the driver is powered on, and the braking mode selection component is located in the first position, so that the first transmission portion is configured to engage with a first execution portion; and
abut against the second stopper portion in response to a case in which the driver is not powered on, and the braking mode selection component is located in the second position, so that the second transmission portion is configured to engage with a second execution portion.

2. The braking mode switching apparatus according to claim 1, wherein the motion control component further comprises:
a cylindrical body extending along a first central axis and coupled to the output shaft of the driver;
a protrusion portion extending away from the cylindrical body from a surface of the cylindrical body, wherein the protrusion portion is configured to:
abut against the first stopper portion in response to a case in which the driver is powered on, and
abut against the second stopper portion in response to a case in which the driver is not powered on;
a coupling shaft extending along a second central axis from one end that is of the cylindrical body and that is close to the protrusion portion, wherein the second central axis deviates from and is parallel to the first central axis; and
a drive ring sleeved on the coupling shaft and coupled to the braking mode selection component.

3. The braking mode switching apparatus according to claim 2, wherein
when the braking mode selection component is in the first position or the second position, a vertical connecting line between the first central axis and the second central axis is parallel to a first direction pointing from the first position to the second position.

4. The braking mode switching apparatus according to claim 2, further comprising:
an elastic member, coupled to the cylindrical body of the motion control component, and configured to reset the cylindrical body when the driver is not powered on, so that the braking mode selection component moves to the second position.

5. The braking mode switching apparatus according to claim 1, further comprising:
a housing comprising a limiting plate provided with a groove for accommodating the braking mode selection component, to limit the braking mode selection component, so that the braking mode selection component moves along a first direction pointing from the first position to the second position.

6. The braking mode switching apparatus according to claim 1, wherein
the first transmission portion further comprises a first toothed portion, the first execution portion further comprises a second toothed portion that is configured to engage with the first toothed portion, and the first toothed portion is configured to engage with the second toothed portion when the driver is powered on.

7. The braking mode switching apparatus according to claim 6, wherein
the second transmission portion further comprises a third toothed portion, the second execution portion comprises a fourth toothed portion that is configured to engage with the third toothed portion, and the third toothed portion is configured to engage with the fourth toothed portion when the driver is not powered on.

8. A brake control system for a vehicle, comprising:
a braking mode switching apparatus, wherein the braking mode switching apparatus comprises:
a braking mode selection component configured to move between a first position corresponding to a first braking mode and a second position corresponding to a second braking mode;
a transmission member coupled to the braking mode selection component, and having a first transmission portion and a second transmission portion;
a stopper comprising a first stopper portion and a second stopper portion;
a driver comprising an output shaft; and
a motion control component disposed on the output shaft and coupled to the braking mode selection component, wherein the motion control component is configured to:
abut against the first stopper portion in response to a case in which the driver is powered on, and the braking mode selection component is located in the first position, so that the first transmission portion is configured to engage with a first execution portion; and
abut against the second stopper portion in response to a case in which the driver is not powered on and the braking mode selection component is located in the second position, so that the second transmission portion is configured to engage with a second execution portion; and a brake pedal coupled to a transmission member by using a connecting rod.

9. The brake control system according to claim 8, wherein the motion control component further comprises:
a cylindrical body extending along a first central axis and coupled to the output shaft of the driver;
a protrusion portion extending away from the cylindrical body from a surface of the cylindrical body, wherein the protrusion portion is configured to:
abut against the first stopper portion in response to a case in which the driver is powered on, and
abut against the second stopper portion in response to a case in which the driver is not powered on;
a coupling shaft extending along a second central axis from one end that is of the cylindrical body and that is close to the protrusion portion, wherein the second central axis deviates from and is parallel to the first central axis; and
a drive ring sleeved on the coupling shaft and coupled to the braking mode selection component.

10. The brake control system according to claim 9, wherein
when the braking mode selection component is in the first position or the second position, a vertical connecting line between the first central axis and the second central axis is parallel to a first direction pointing from the first position to the second position.

11. The brake control system according to claim 9, further comprising:
an elastic member, coupled to the cylindrical body of the motion control component, and configured to reset the cylindrical body when the driver is not powered on, so that the braking mode selection component moves to the second position.

12. The brake control system according to claim 8, further comprising:
a housing comprising a limiting plate provided with a groove for accommodating the braking mode selection component, to limit the braking mode selection component, so that the braking mode selection component moves along a first direction pointing from the first position to the second position.

13. The brake control system according to claim 8, wherein
the first transmission portion further comprises a first toothed portion, the first execution portion further comprises a second toothed portion that is configured to engage with the first toothed portion, and the first toothed portion is configured to engage with the second toothed portion when the driver is powered on.

14. The brake control system according to claim 13, wherein
the second transmission portion further comprises a third toothed portion, the second execution portion further comprises a fourth toothed portion that is configured to engage with the third toothed portion, and the third toothed portion is configured to engage with the fourth toothed portion when the driver is not powered on.

15. The brake control system according to claim 8, further comprising:
a feedback assembly coupled to a first execution portion of the braking mode switching apparatus, wherein the feedback assembly is configured to provide a reverse acting force to the brake pedal when a driver is powered on.

16. The brake control system according to claim 8, further comprising:
a brake cable coupled to a second execution portion of the braking mode switching apparatus, wherein the brake cable is configured to brake the vehicle when a driver is not powered on.

17. A vehicle, comprising:
a brake control system, wherein the brake control system comprises a braking mode switching apparatus comprising:
a braking mode selection component configured to move between a first position corresponding to a first braking mode and a second position corresponding to a second braking mode;
a transmission member coupled to the braking mode selection component, and having a first transmission portion and a second transmission portion;
a stopper comprising a first stopper portion and a second stopper portion;
a driver comprising an output shaft; and
a motion control component disposed on the output shaft and coupled to the braking mode selection component, wherein the motion control component is configured to:
abut against the first stopper portion in response to a case in which the driver is powered on, and the braking mode selection component is located in the first position, so that the first transmission portion is configured to engage with a first execution portion; and
abut against the second stopper portion in response to a case in which the driver is not powered on, and the braking mode selection component is located in the second position, so that the second transmission portion is configured to engage with a second execution portion; and
the brake control system comprises a brake pedal that is coupled to a transmission member by using a connecting rod.

18. The vehicle according to claim 17, wherein the motion control component further comprises:
a cylindrical body extending along a first central axis and coupled to the output shaft of the driver;
a protrusion portion extending away from the cylindrical body from a surface of the cylindrical body, wherein the protrusion portion is configured to:
abut against the first stopper portion in response to a case in which the driver is powered on, and
abut against the second stopper portion in response to a case in which the driver is not powered on;
a coupling shaft extending along a second central axis from one end that is of the cylindrical body and that is close to the protrusion portion, wherein the second central axis deviates from and is parallel to the first central axis; and
a drive ring sleeved on the coupling shaft and coupled to the braking mode selection component.

19. The vehicle according to claim 18, wherein
when the braking mode selection component is in the first position or the second position, a vertical connecting line between the first central axis and the second central axis is parallel to a first direction pointing from the first position to the second position.

20. The vehicle according to claim 18, further comprising:
an elastic member coupled to the cylindrical body of the motion control component, and configured to reset the cylindrical body when the driver is not powered on, so that the braking mode selection component moves to the second position.

* * * * *